UNITED STATES PATENT OFFICE.

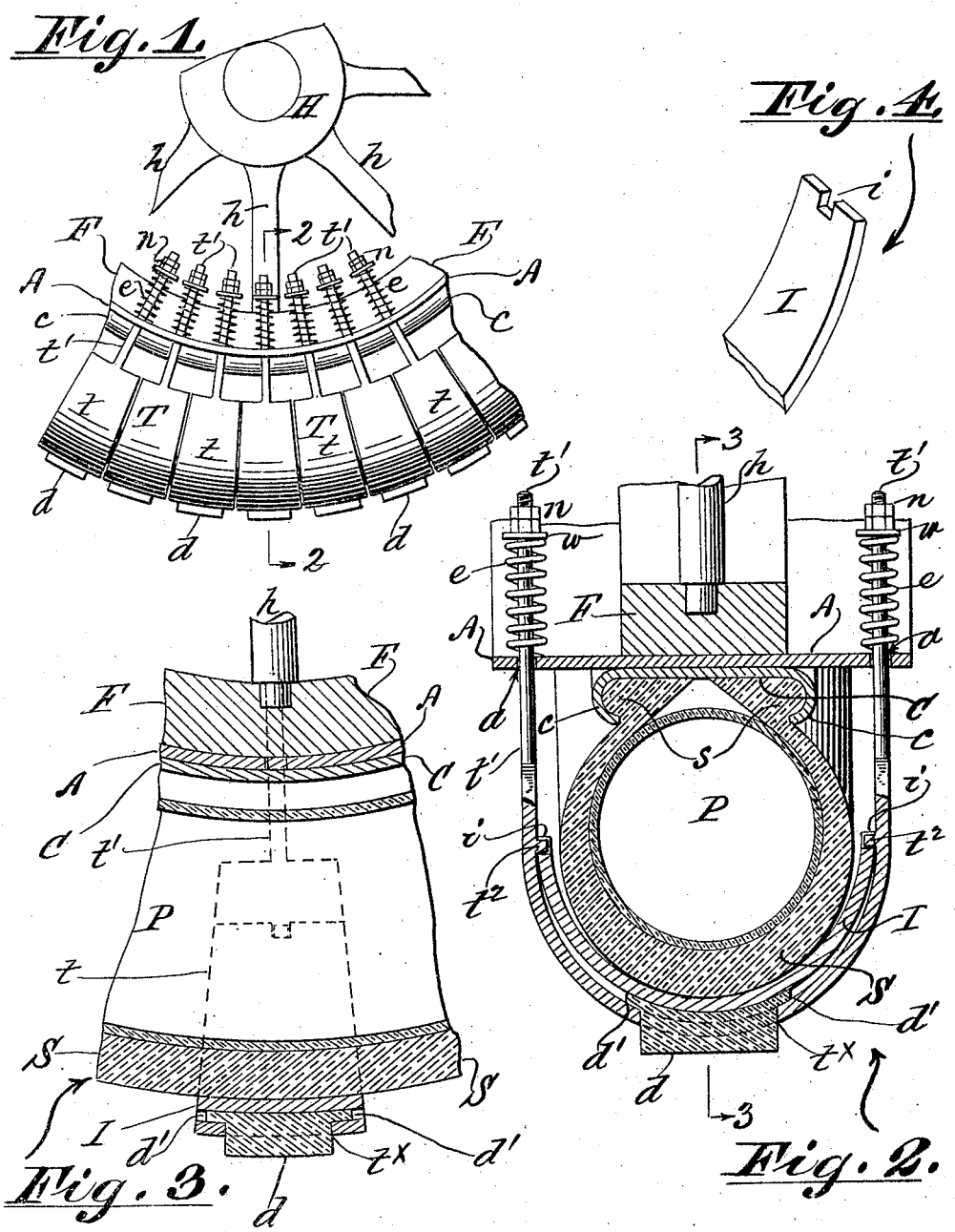

JAMES A. HEALY, OF BROOKLYN, NEW YORK.

PNEUMATIC-TIRE TREAD.

1,398,513. Specification of Letters Patent. Patented Nov. 29, 1921.

Application filed April 14, 1921. Serial No. 461,253.

*To all whom it may concern:*

Be it known that I, JAMES A. HEALY, a citizen of the United States, and a resident of the borough of Brooklyn, county of Kings, city and State of New York, have invented certain new and useful Improvements in Pneumatic-Tire Treads, of which the following is a specification.

While the essential features of my improvements are applicable to vehicle wheels generally they are designed more especially for use and incorporation with pneumatic tire wheels used on automobiles, auto-trucks, and motor-driven vehicles such as are well known in the state of the art.

The main object of my invention is to attain a simple, practicable, puncture-proof, elastic resilient anti-skid tire of the character designated adapted to long use and service, and provided with yieldably mounted peripheral tread sections which are readily replaceable, and which reinforce and protect the pneumatic tire, etc., as hereinafter more fully set forth,—the invention consisting in the specific combination and arrangement of parts described and claimed, and a distinctive feature being the provision of a plurality of independently mounted replacement stirrups, carrying elastic resilient contact pads which are also replaceable, without impairing the functions and utility of the ordinary pneumatic tire to which my peripheral protecting means are applied.

In the accompanying drawings,

Figure 1, is a side elevation of the lower portion of an ordinary pneumatic tire wheel illustrating a practical embodiment of my invention as related thereto;

Fig. 2, is a transverse section, upon a larger scale, taken upon plane of line 2—2, Fig. 1;

Fig. 3, is a section taken upon plane of line 3—3, Fig. 2;

Fig. 4, is a perspective detail of one end of the intermediate tread plate.

H, represents the hub of an automobile wheel, connected by the spokes $h$, with the felly F. A, is an annular flange plate interposed between said felly and the clencher rim C, of well known construction, formed with the inturned flanges $c, c$, which clench the basic flanges $s, s$, of the shoe S, P representing the usual pneumatic tube positioned within the shoe S.

It will of course be understood that, as indicated in Fig. 1, a plurality of traction stirrups T, are provided for each pneumatic tire, extending around the periphery thereof, so as to constitute practically a continuous traction surface, the edges of the main or plate portions $t$, of said traction stirrups being convergent inward toward the axis of the wheel, and said plate $t$, portions being of a width which leaves a slight space between the edges of adjacent stirrups, so that the stirrups will not bind against each other as the tire is compressed during traction.

The medial portion of each stirrup plate $t$, is formed with two suspender studs $t', t'$, which extend upward through bearing holes $a, a$, formed for the purpose in the annular flange plate A; and the inner ends of these suspender studs $t', t'$, are screw threaded for the reception of nuts $n, n$. Interposed between the annular flange plate A, and the nuts (or between washers $w, w$, provided for the purpose) are elastic resilient springs $e, e$, which tend constantly to draw the stirrup T, inward.

The central peripheral portion of each traction stirrup is formed with a recess $t^x$, in which is sealed a tread pad $d$, formed with flanges $d', d'$, which hold said tread pad $d$, in position; and I, is an intermediate bearing plate, interposed between the rear face of said tread pad $d$, and the shoe S, of the tire, as shown particularly in Fig. 2, of the drawings.

The ends of the intermediate bearing plate I, are notched or recessed, as at $i$, to engage with lugs $t^2, t^2$, on the inner sides of the traction stirrup, and thereby preserve the alinement and correlation of the parts. The function of the intermediate bearing plate I, is to protect both the tread pad $d$, and the shoe S, of the pnuematic tire against undue or unnecessary wear,—said intermediate bearing plate I, being of course metallic, while the tread pad $d$, and shoe S, are preferably formed of a rubber composition such as is well known in the art.

The protuberant tread pads $d$, acting in conjunction with the stirrups T, tend to counteract any tendency of the wheel to "skid" laterally, and as they are readily replaceable at slight trouble and expense, they form an important and distinctive feature of my invention.

When however the main object to be sought is the protection of the pneumatic against puncture, the tread pads $d'$, may be dispensed with, and the stirrup plates T, may contact directly with the ground, thereby effectually shielding the tire and bearing the brunt of the traction wear.

What I claim as my invention and desire to secure by Letters Patent is,

1. In combination with a pneumatic tire of the character designated, an annular flange plate interposed between the felly and the rim, a shaped traction stirrup suspended on said annular flange plate by elastic resilient means, a demountable tread pad mounted on said stirrup, and an intermediate metallic bearing plate interposed between said tread pad and the shoe of the tire, for the purpose described.

2. In combination with a pneumatic tire of the character designated, an annular flange plate interposed between the felly and the rim, a shaped traction stirrup suspended on said annular flange plate by elastic resilient means, a tread pad mounted on said stirrup, and an intermediate bearing plate interposed between said tread pad and the shoe of the tire, said intermediate bearing plate being coupled to the U-shaped stirrup, for the purpose described.

3. In combination with a pneumatic tire of the character designated, an annular flange plate interposed between the felly and the rim, a U-shaped traction stirrup having suspender arms extending through said annular flange plate and formed with screw threaded ends, bearing nuts engaging said threaded ends of the suspenders, and springs interposed between said nuts and said annular flange plate, said stirrup being also provided with a demountable tread pad, and having a bearing plate interposed between the tread pad and the shoe of the tire, for the purpose described.

4. In combination with a pneumatic tire of the character designated, an annular flange plate interposed between the felly and the rim, a U-shaped traction stirrup having suspender arms extending through said annular flange plate and formed with screw threaded ends, bearing nuts engaging said threaded ends of the suspenders, and springs interposed between said nuts and said annular flange plate, said stirrup being also provided with a demountable tread pad, and having a bearing plate interposed between the tread pad and the shoe of the tire, said stirrup being formed with inturned lugs engaging with notches in said intermediate bearing plate, for the purpose described.

JAMES A. HEALY.

Witnesses:
  GEO. WM. MIATT,
  DOROTHY MIATT.